United States Patent
Alerwi et al.

(10) Patent No.: US 12,422,291 B2
(45) Date of Patent: Sep. 23, 2025

(54) MULTIPHASE FLUID VOLUME MEASUREMENT

(71) Applicant: Saudi Arabian Oil Company, Dhahran (SA)

(72) Inventors: Maher Hamed Alerwi, Dhahran (SA); Ghazi Salman Qahtani, Khobar (SA); Arij Ibrahim Ruwaii, Qatif (SA); Abdulaziz A. Alruwaithi, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 355 days.

(21) Appl. No.: 18/134,269

(22) Filed: Apr. 13, 2023

(65) Prior Publication Data

US 2024/0344866 A1 Oct. 17, 2024

(51) Int. Cl.
*G01F 1/74* (2006.01)
*G01F 1/84* (2006.01)

(52) U.S. Cl.
CPC .............. *G01F 1/74* (2013.01); *G01F 1/8431* (2013.01)

(58) Field of Classification Search
CPC ................................ G01F 1/74; G01F 1/8431
See application file for complete search history.

(56) References Cited

U.S. PATENT DOCUMENTS

| | | | |
|---|---|---|---|
| 5,361,632 A | 11/1994 | Magnani | |
| 9,134,160 B2 | 9/2015 | Ahmad et al. | |

FOREIGN PATENT DOCUMENTS

| | | | |
|---|---|---|---|
| CN | 202854065 | 4/2013 | |
| CN | 204312835 | 5/2015 | |
| JP | 2009294056 A | * 12/2009 | .............. G01M 3/04 |
| WO | WO 2017160411 | 9/2017 | |

OTHER PUBLICATIONS

Foster et al., "PIV measurements within the waves of wavy and wavy-annular horizontal two-phase flow," presented at the ASME Summer Heat Transfer Conference, San Francisco Conference, Jul. 17-22, 2005, 9 pages.

Hitomi et al., "Ultrasound Flow-Monitoring and Flow-Metering of Air-Oil-Water Three-Layer Pipe Flows, " IEEE Access, 2017, 5:15021-15029, 8 pages.

Kanin et al., "A predictive model for steadystate multiphase pipe flow: Machine learning on lab data," Journal of Petroleum Science and Engineering, Sep. 2019, 180:727-746, 23 pages.

(Continued)

*Primary Examiner* — Timothy P Graves
(74) *Attorney, Agent, or Firm* — Fish & Richardson P.C.

(57) ABSTRACT

An apparatus includes a first body, a tubular, a first electric contact, a second body, a beam, a first plurality of electric contacts, and a controller. The first electric contact is disposed at an end of the tubular. The beam is coupled to the second body by a rotatable joint. The beam passes through the end of the tubular and is at least partially disposed within the tubular. The first plurality of electric contacts are disposed along the beam. Any one of the first plurality of electric contacts is in contact with the first electric contact at any given time. The controller is configured to identify which of the first plurality of electric contacts is in contact with the first electric contact and determine a distance between the first body and the second body.

19 Claims, 7 Drawing Sheets

(56) References Cited

OTHER PUBLICATIONS

Li et al., "Combined experimental and numerical investigation of multiphase flow during water entry of spheres with different densities," International Journal of Multiphase Flow, Dec. 2022, 18 pages.

Smith, "A Study of Pressure Drops and Void Fractions in Horizontal Two-Phase Flows of Potassium (8 per cent sodium)," a dissertation submitted for the degree of Doctor of Philosophy, University of Michigan, Department of Chemical and Metallurgical Engineering, Apr. 1964, 204 pages.

* cited by examiner

MULTIPHASE FLUID VOLUME MEASUREMENT

TECHNICAL FIELD

This disclosure relates to measurement of multiphase fluids.

BACKGROUND

A multiphase fluid is a mixture of multiple phases of matter. Multiphase fluids can be non-homogenous and can thus exhibit complex flow characteristics. The characteristics of the flow of multiphase fluids in a conduit, for example, can depend on various factors, such as operating conditions (pressure and temperature), composition (and in turn, physical properties such as density and viscosity) of each of the phases, flow rate of each of the phases, and physical characteristics of the conduit (such as diameter and orientation) through which the multiphase fluid is flowing. Characterization of the flow of multiphase fluids can sometimes be difficult. In some cases, for example, in oil and gas operations, accurate flow metering of multiphase fluid mixtures (such as crude oil, natural gas, and brine) can be important.

SUMMARY

This disclosure describes technologies relating to measurement of multiphase fluids. Certain aspects of the subject matter described can be implemented as an apparatus. The apparatus includes a first body, a tubular, a first electric contact, a second body, a beam, a first plurality of electric contacts, and a controller. The first body has a first density. The second body has a second density that is greater than the first density of the first body. The tubular has a first end and a second end. The first end is connected to the first body. The second end is an open end. The first electric contact is disposed at the second end of the tubular. The beam is coupled to the second body by a rotatable joint. The second body is configured to rotate about the rotatable joint. The beam passes through the second end of the tubular. The beam is at least partially disposed within the tubular. The first plurality of electric contacts are disposed along a longitudinal length of the beam. Any one of the first plurality of electric contacts is in contact with the first electric contact at any given time. The controller is disposed within the second body. The controller is communicatively coupled to the first electric contact and the first plurality of electric contacts. The controller is configured to identify which of the first plurality of electric contacts is in contact with the first electric contact. The controller is configured to determine a distance between the first body and the second body at least based on the identified one of the first plurality of electric contacts that is in contact with the first electric contact.

This, and other aspects, can include one or more of the following features. The apparatus can include an odometer. The odometer can be coupled to the second body. The odometer can be configured to measure a distance traveled by the second body. The controller can be communicatively coupled to the odometer. The controller can be configured to receive the distance traveled by the second body measured by the odometer. The controller can be configured to determine a volume of fluid between the first body and the second body at least based on the distance traveled by the second body and the distance between the first body and the second body. The rotatable joint can include a ball and a socket. The ball can be connected to the beam. The socket can be connected to the second body. The socket can be disposed within the second body. The apparatus can include a second electric contact. The second electric contact can be disposed on the ball of the rotatable joint. The apparatus can include a second plurality of electric contacts. The second plurality of electric contacts can be distributed across the socket of the rotatable joint. Any one of the second plurality of electric contacts can be in contact with the second electric contact at any given time. The controller can be communicatively coupled to the second electric contact and the second plurality of electric contacts. The controller can be configured to identify which of the second plurality of electric contacts is in contact with the second electric contact. The controller can be configured to determine an angle at which the second body is skewed with respect to the beam based on the identified one of the second plurality of electric contacts that is in contact with the second electric contact. The volume of fluid between the first body and the second body can be determined at least based on the distance traveled by the second body, the distance between the first body and the second body, and the angle at which the second body is skewed with respect to the beam.

Certain aspects of the subject matter described can be implemented as a system. The system includes an apparatus. The apparatus is configured to be disposed within a pipe that is flowing a multiphase fluid. The multiphase fluid includes an oil phase and an aqueous phase. The apparatus is configured to travel with the multiphase fluid flowing in the pipe. The apparatus includes a first sphere, a tubular, a first electric contact, a second sphere, a beam, a first plurality of electric contacts, and a controller. The first sphere has a first density that is less than an oil density of the oil phase, such that the first sphere floats on the oil phase. The second sphere has a second density greater than the oil density and less than an aqueous density of the aqueous phase, such that the second sphere is disposed between the oil phase and the aqueous phase. The tubular has a first end and a second end. The first end is connected to the first sphere. The second end is an open end. The first electric contact is disposed at the second end of the tubular. The beam is coupled to the second sphere by a rotatable joint. The second sphere is configured to rotate about the rotatable joint. The beam passes through the second end of the tubular. The beam is at least partially disposed within the tubular. The first plurality of electric contacts is disposed along a longitudinal length of the beam. Any one of the first plurality of electric contacts is in contact with the first electric contact at any given time. The controller is disposed within the second sphere. The controller is communicatively coupled to the first electric contact and the first plurality of electric contacts. The controller is configured to identify which of the first plurality of electric contacts is in contact with the first electric contact. The controller is configured to determine a distance between the first sphere and the second sphere at least based on the identified one of the first plurality of electric contacts that is in contact with the first electric contact.

This, and other aspects, can include one or more of the following features. The apparatus can include an odometer. The odometer can be coupled to an exterior of the second sphere. The odometer can include a propeller. The propeller can be configured to rotate as the apparatus travels through the pipe. The odometer can be configured to measure a distance traveled by the second sphere in response to rotation of the propeller. The controller can be communicatively coupled to the odometer. The controller can be configured to receive the distance traveled by the second sphere measured by the odometer. The controller can be configured to determine a volume of the first liquid phase between the first sphere and the second sphere at least based on the distance traveled by the second sphere and the distance between the first sphere and the second sphere. The rotatable joint can include a ball and a socket. The ball can be connected to the beam. The socket can be connected to and disposed within the second sphere. The apparatus can include a second electric contact. The second electric contact can be disposed on the ball of the rotatable joint. The apparatus can include a second plurality of electric contacts. The second plurality of electric contacts can be distributed across the socket of the rotatable joint. Any one of the second plurality of electric contacts can be in contact with the second electric contact at any given time. The controller can be communicatively coupled to the second electric contact and the second plurality of electric contacts. The controller can be configured to identify which of the second plurality of electric contacts is in contact with the second electric contact. The controller can be configured to determine an angle at which the second sphere is skewed with respect to the beam based on the identified one of the second plurality of electric contacts that is in contact with the second electric contact. The volume of first liquid phase between the first sphere and the second sphere can be determined at least based on the distance traveled by the second sphere, the distance between the first sphere and the second sphere, and the angle at which the second sphere is skewed with respect to the beam.

Certain aspects of the subject matter described can be implemented as a method. An apparatus is flowed with a multiphase fluid through a pipe. The multiphase fluid includes an oil phase and an aqueous phase. The apparatus includes a first body and a second body. The first body and the second body are connected to each other. The first body floats at a surface of the oil phase. The second body floats at an interface between the oil phase and the aqueous phase. A distance between the first body and the second body is determined. A distance traveled by the apparatus through the pipe is determined. A volume of the oil phase between the first body and the second body is determined at least based on the distance between the first body and the second body and the distance traveled through the pipe by the apparatus.

This, and other aspects, can include one or more of the following features. The apparatus can include a tubular, a first electric contact, a beam, and a first plurality of electric contacts. The tubular can be connected to the first body. The first electric contact can be disposed at an end of the tubular. The beam can be coupled to the second body. The beam can pass through at least a portion of the tubular. The beam can be at least partially disposed within the tubular. The first plurality of electric contacts can be disposed along the beam. Any one of the first plurality of electric contacts can be in contact with the first electric contact at any given time. Determining the distance between the first body and the second body can include identifying which of the first plurality of electric contacts is in contact with the first electric contact. Determining the distance between the first body and the second body can include determining the distance between the first body and the second body at least based on the identified one of the first plurality of electric contacts that is in contact with the first electric contact. The distance traveled by the second body can be determined by an odometer. The odometer can include a propeller. The propeller can be coupled to an exterior of the second body. The odometer can determine the distance traveled by the second body in response to rotation of the propeller as the apparatus travels through the pipe. The beam can be coupled to the second body by a rotatable joint, such that the second body is configured to rotate about the rotatable joint. The rotatable joint can include a ball and a socket. The ball can be connected to the beam. The socket can be connected to and disposed within the second body. The apparatus can include a second electric contact. The second electric contact can be disposed on the ball of the rotatable joint. The apparatus can include a second plurality of electric contacts. The second plurality of electric contacts can be distributed across the socket of the rotatable joint. Any one of the second plurality of electric contacts can be in contact with the second electric contact at any given time. The method can include identifying which of the second plurality of electric contacts is in contact with the second electric contact. The method can include determining an angle at which the second body is skewed with respect to the beam based on the identified one of the second plurality of electric contacts that is in contact with the second electric contact. The volume of oil phase between the first body and the second body can be determined at least based on the distance traveled by the second body, the distance between the first body and the second body, and the angle at which the second body is skewed with respect to the beam.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

The technology relates to rheology measurement of multiphase flow in pipes. The proposed apparatus includes two portions having different densities and connected to each other. The distance between the two portions and the orientation of the two portions relative to one another can be measured and correlated to rheological measurements of the multiphase fluid flowing in the pipe. The apparatus can also measure horizontal distance traveled (for example, by an odometer) to determine holdup volume. The apparatus includes electric contacts distributed across the two portions for determining the distance between the two portions and the orientation of the two portions relative to one another. The apparatus can include a microprocessor for processing the measured data to determine rheological measurements of the multiphase fluid flowing in the pipe.

The subject matter described in this disclosure can be implemented in particular implementations, so as to realize one or more of the following advantages. The apparatuses, systems, and methods described can be implemented to accurately determine holdup volume of a multiphase fluid flowing in a pipe in real-time. The apparatuses, systems, and methods described can be implemented to determine a flow regime (such as laminar or turbulent) of a multiphase fluid flowing in a pipe. The apparatuses, systems, and methods described can be implemented to predict a rate of corrosion in a pipe that is flowing a multiphase fluid based on the holdup volume determined. The apparatuses, systems, and methods described can be implemented to accurately determine the levels of the various phases of the multiphase fluid flowing in the pipe across the entirety of the pipe.

Figure 1:
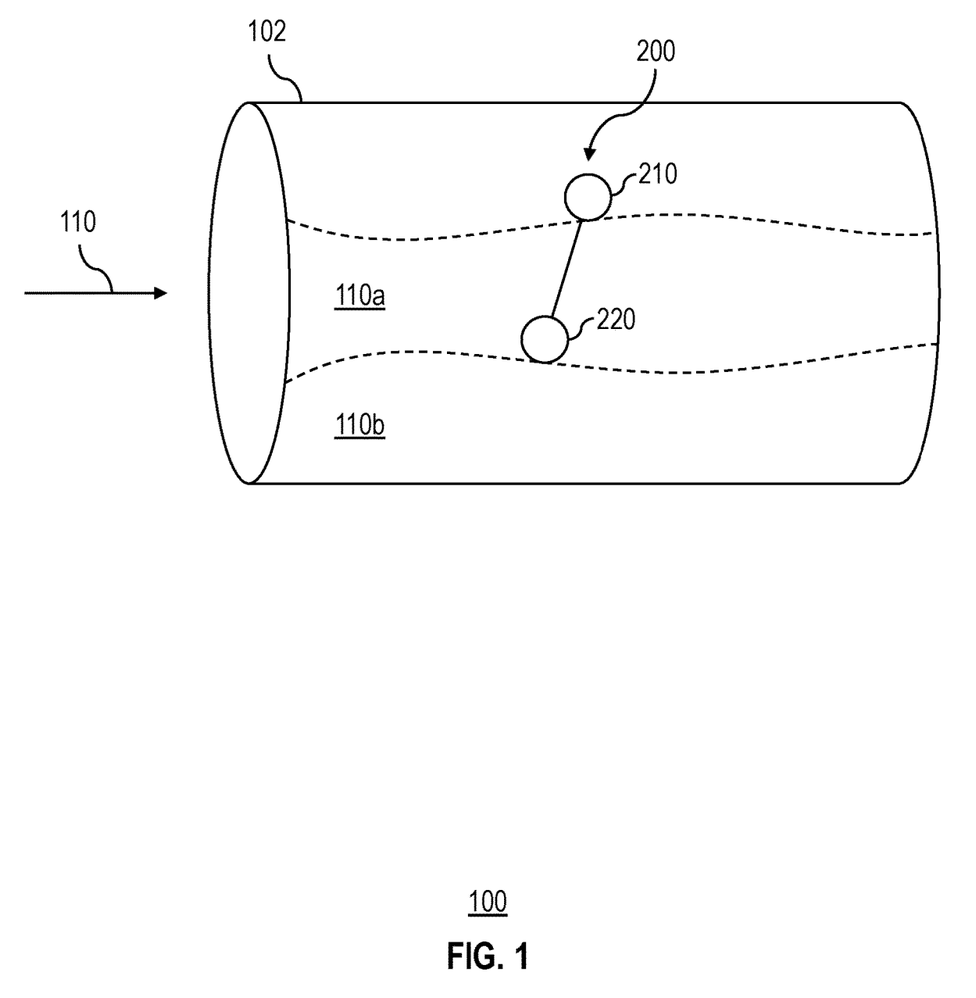
FIG. 1 is a schematic diagram of an example system for volume measurement in multiphase fluids.
Figure 2A:
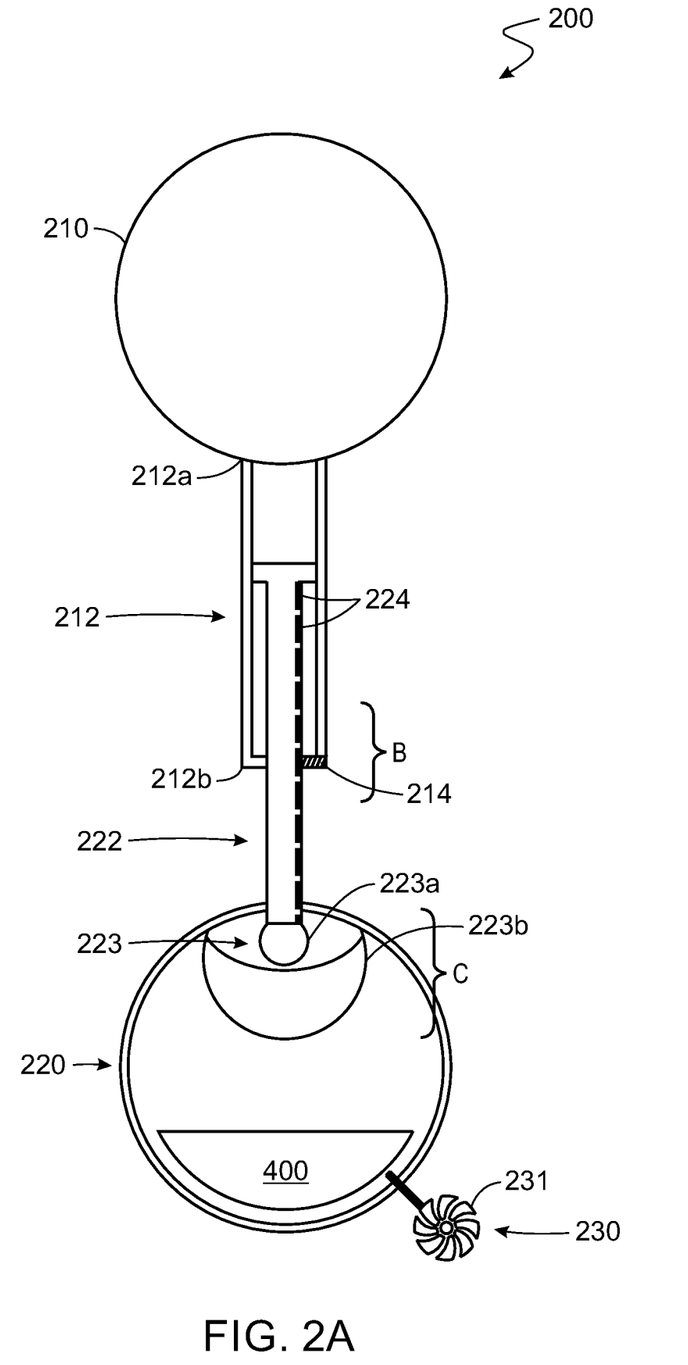
FIG. 2A is a schematic diagram of an example apparatus for volume measurement in multiphase fluids.

FIG. 1 is a schematic diagram of an example system 100 for volume measurement in multiphase fluids. The system 100 includes an apparatus 200 that is configured to be disposed within a pipe 102 that flows a multiphase fluid 110. The multiphase fluid 110 can include an oil phase 110a and an aqueous phase 110b. The oil phase 110a can include, for example, a hydrocarbon. The aqueous phase 110b includes water. The aqueous phase 110b can include, for example, dissolved solids, such as salt. The apparatus 200 is configured to travel with the multiphase fluid 110 flowing in the pipe 102. The apparatus 200 includes a first body 210 and a second body 220 that are connected to each other. The first body 210 has a density that is less than a density of the oil phase 110a, such that the first body 210 floats at a surface of the oil phase 110a. The second body 220 has a density that is greater than the density of the oil phase 110a and less than a density of the aqueous phase 110b, such that the second body 220 floats at an interface between the oil phase 110a and the aqueous phase 110b. The apparatus 200 is also shown in FIG. 2A and is described in more detail later. By determining the distance between the first body 210 and the second body 220, a distance traveled through the pipe 102 by the apparatus 200, and a skew angle of the apparatus 200 (for example, an angle at which the apparatus 200 deviates from a vertical as the apparatus 200 flows with the multiphase fluid 110 in the pipe 102), a volume (for example, holdup volume) of the oil phase 110a between the first body 210 and the second body 220 can be determined.

Figure 2B:
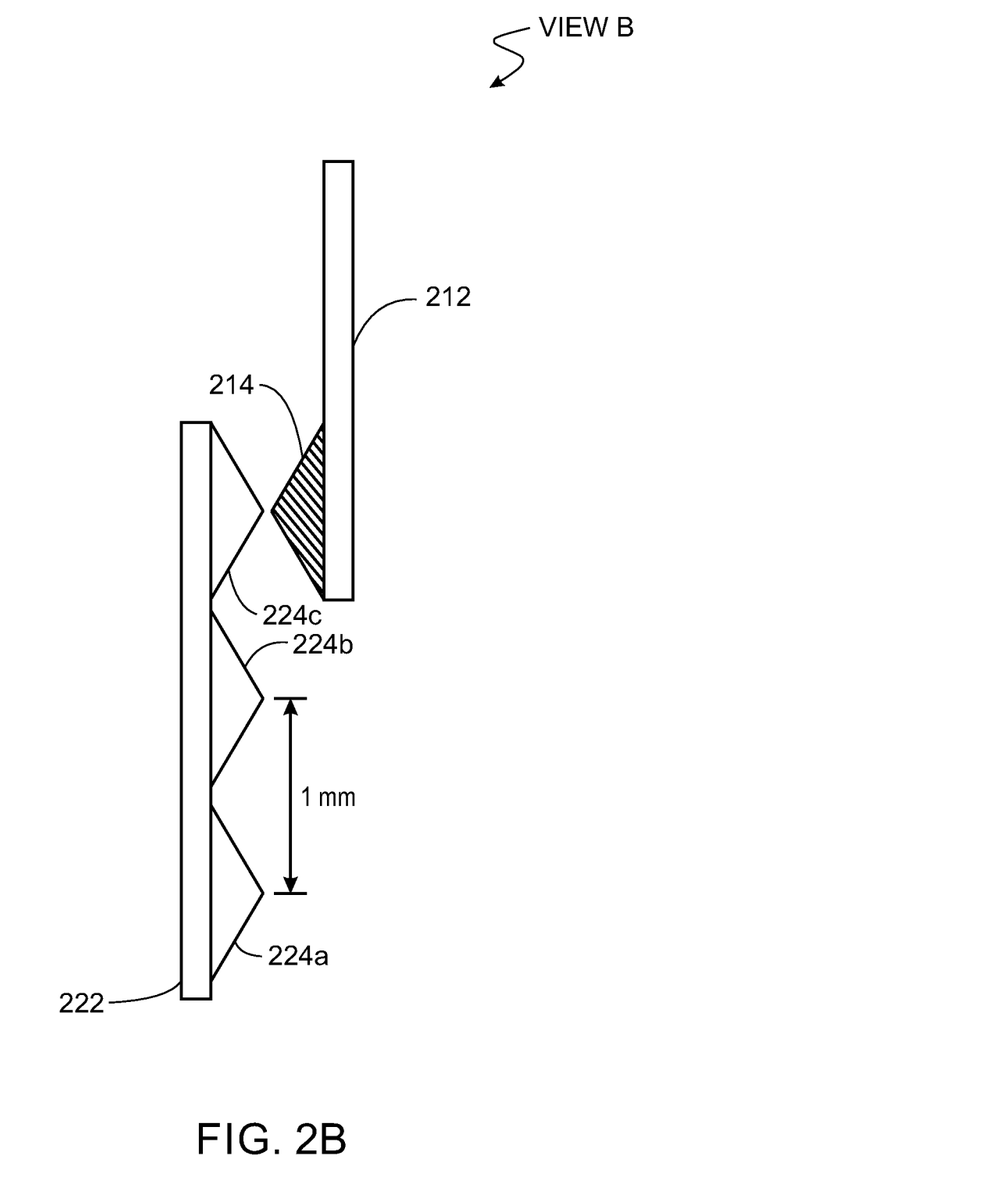
FIG. 2B is a zoomed view of a portion of the apparatus of FIG. 2A.
Figure 2C:
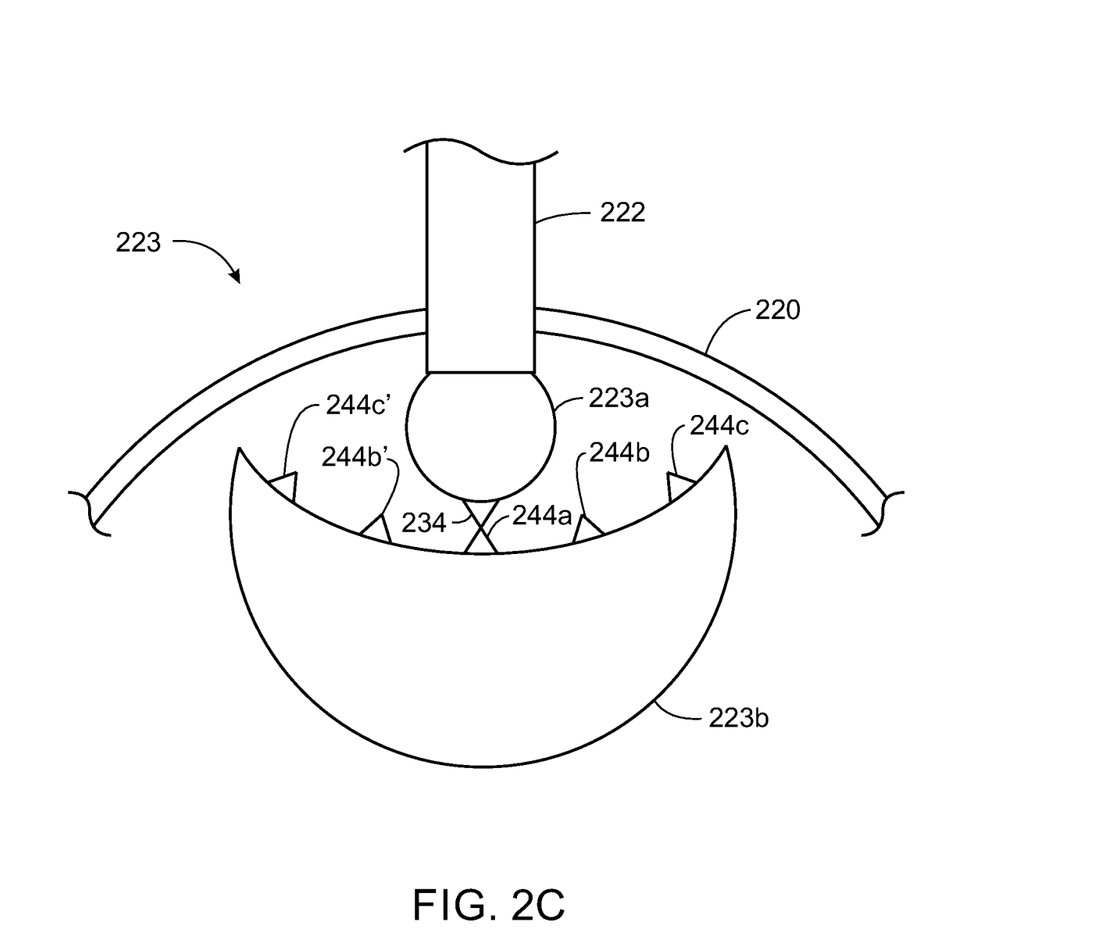
FIG. 2C is a zoomed view of a portion of the apparatus of FIG. 2A.

FIG. 2A is a schematic diagram of an implementation of the apparatus 200. FIGS. 2B and 2C are zoomed views of the portion B and the portion C, respectively, of the apparatus 200. The apparatus 200 includes the first body 210 and the second body 220. The first body 210 can, for example, be a sphere. The second body 220 can, for example, be a sphere. The apparatus 200 includes a tubular 212 having a first end 212a and a second end 212b. The first end 212a is connected to the first body 210. The second end 212b is an open end. The apparatus 200 includes an electric contact 214 disposed at the second end 212b of the tubular 212. The apparatus 200 includes a beam 222 that is coupled to the second body 220 by a rotatable joint 223. The second body 220 is configured to rotate about the rotatable joint 223. The beam 222 passes through the second end 212b of the tubular 212. The beam 222 is at least partially disposed within the tubular 212. The apparatus 200 includes a plurality of electric contacts 224 that are disposed along a longitudinal length of the beam 222. Any one of the plurality of electric contacts 224 is in contact with the electric contact 214 at any given time. The apparatus 200 includes a controller 400 that is disposed within the second body 220. The controller 400 can, for example, be a computer. The controller 400 is communicatively coupled to the electric contact 214 and the plurality of electric contacts 224. The controller 400 is configured to identify which electric contact of the plurality of electric contacts 224 is in contact with the electric contact 214. The controller 400 is configured to determine a distance between the first body 210 and the second body 220 at least based on the identified electric contact of the plurality of electric contacts 224 that is in contact with the electric contact 214. For example, the plurality of electric contacts 224 can be evenly distributed along the longitudinal length of the beam 222. Once the controller 400 has identified which of the plurality of electric contacts 224 is in contact with the electric contact 214, the controller 400 can determine the distance between the first body 210 and the second body 220 based on known characteristics (for example, length of the tubular 212, length of the beam 222, and distance between neighboring electric contacts 224) and the identified electric contact.

In the specific implementation shown in FIG. 2B, the plurality of electric contacts 224 are spaced apart by 1 millimeter (mm), so the controller 400 can determine distance between the first body 210 and the second body 220 with 1-mm accuracy. The plurality of electric contacts 224 can be spaced apart by a shorter distance (for example, 0.5 mm, 0.1 mm, or shorter) or by a longer distance (for example, 2 mm, 5 mm, or longer). In the specific implementation shown in FIG. 2B, when the electric contact 214 is in contact with the electric contact labeled 224a, the controller 400 can determine that the distance between the first body 210 and the second body 220 is 25 millimeters. In the specific implementation shown in FIG. 2B, when the electric contact 214 is in contact with the electric contact labeled 224b, the controller 400 can determine that the distance between the first body 210 and the second body 220 is 26 millimeters. In the specific implementation shown in FIG. 2B, when the electric contact 214 is in contact with the electric contact labeled 224c, the controller 400 can determine that the distance between the first body 210 and the second body 220 is 27 millimeters. In some implementations, the apparatus 200 continuously tracks the distance between the first body 210 and the second body 220. In some implementations, the apparatus 200 tracks the distance between the first body 210 and the second body 220 at predetermined time intervals, for example, in 1-second intervals, 2-second intervals, or 3-second intervals.

In some implementations, the apparatus 200 includes an odometer 230 that is coupled to the second body 220. The odometer 230 can be configured to measure a distance traveled by the second body 220. The odometer 230 can include a propeller 231 that is configured to rotate as the apparatus 200 travels through the pipe 102. The propeller 231 can be coupled to an exterior of the second body 220. As the apparatus 200 travels through the pipe 102, flow of the surrounding fluid (for example, the oil phase 110a, the aqueous phase 110b, or both) can cause the propeller 231 to rotate. The odometer 230 can be configured to measure the distance traveled by the second body 220 in response to rotation of the propeller 231. The controller 400 can be communicatively coupled to the odometer 230. The controller 400 can be configured to receive the distance traveled by the second body 220 that was measured by the odometer 230. The controller 400 can be configured to determine a volume of fluid (for example, holdup volume of the oil phase 110a) between the first body 210 and the second body 220 at least based on the distance traveled by the second body 220 and the distance between the first body 210 and the second body 220. In some implementations, the odometer 230 continuously tracks the distance traveled by the apparatus 200 through the pipe 102.

In some implementations, the rotatable joint 223 includes a ball 223a and a socket 223b. The ball 223a can be connected to the beam 222. The socket 223b can be connected to and disposed within the second body 220. The apparatus 200 can include an electric contact 234 disposed on the ball 223a of the rotatable joint 223. The apparatus 200 can include a plurality of electric contacts 244 distributed across the socket 223b of the rotatable joint 223. Any one of the plurality of electric contacts 244 can be in contact with the electric contact 234 at any given time. The controller 400 can be communicatively coupled to the electric contact 234 and the plurality of electric contacts 244. The controller 400 can be configured to identify which electric contact of the plurality of electric contacts 244 is in contact with the electric contact 234. The controller 400 can be configured to determine an angle at which the second body 220 is skewed with respect to the beam 222 at least based on the identified electric contact of the plurality of electric contacts 244 that is in contact with the electric contact 234. For example, the plurality of electric contacts 244 can be evenly distributed along the socket 223b of the rotatable joint 223. Once the controller 400 has identified which of the plurality of electric contacts 244 is in contact with the electric contact 234, the controller 400 can determine the angle at which the second body 220 is skewed in relation to the beam 222 based on known characteristics (for example, location of a reference electric contact of the plurality of electric contacts 244 at which the second body 220 and the beam 222 are in-line with each other and not skewed (vertical)) and the identified electric contact. In some implementations, the second body 220 includes a weight opposite the rotatable joint 223, such that the heaviest portion of the second body 220 is located opposite of the rotatable joint 223. The weight can cause the second body 220 to rotate about the rotatable joint 223 to be oriented in a manner in which the weight as located at the bottom of the second body 220 due to gravity. The inclusion of the weight in the second body 220 can allow for accurate skew angle measurement at any given time, as the weight always orients the second body 220 in relation to gravity. In some implementations, the controller 400 is disposed within the second body 220 and located opposite the rotatable joint 223, such that the controller 400 serves as the weight for the second body 220.

In the specific implementation shown in FIG. 2C, the plurality of electric contacts 244 are spaced apart by 30°, so the controller 400 can determine the skew angle between the second body 220 and the beam 222 with 30° accuracy. The plurality of electric contacts 244 can be spaced apart by a smaller angle (for example, 20°, 10°, 5°, or smaller) or by a larger angle (for example, 35°, 40°, or larger). In the specific implementation shown in FIG. 2C, when the electric contact 234 is in contact with the electric contact labeled 244a, the controller 400 can determine that the skew angle between the second body 220 and the beam 222 is 90°. In the specific implementation shown in FIG. 2C, when the electric contact 234 is in contact with the electric contact labeled 244b or 244b', the controller 400 can determine that the skew angle between the second body 220 and the beam 222 is 60°. In the specific implementation shown in FIG. 2C, when the electric contact 234 is in contact with the electric contact labeled 244c or 244c', the controller 400 can determine that the skew angle between the second body 220 and the beam 222 is 30°. In some implementations, the apparatus 200 continuously tracks the skew angle between the second body 220 and the beam 222. In some implementations, the apparatus 200 tracks the skew angle between the second body 220 and the beam 222 at predetermined time intervals, for example, in 1-second intervals, 2-second intervals, or 3-second intervals.

Figure 2D:
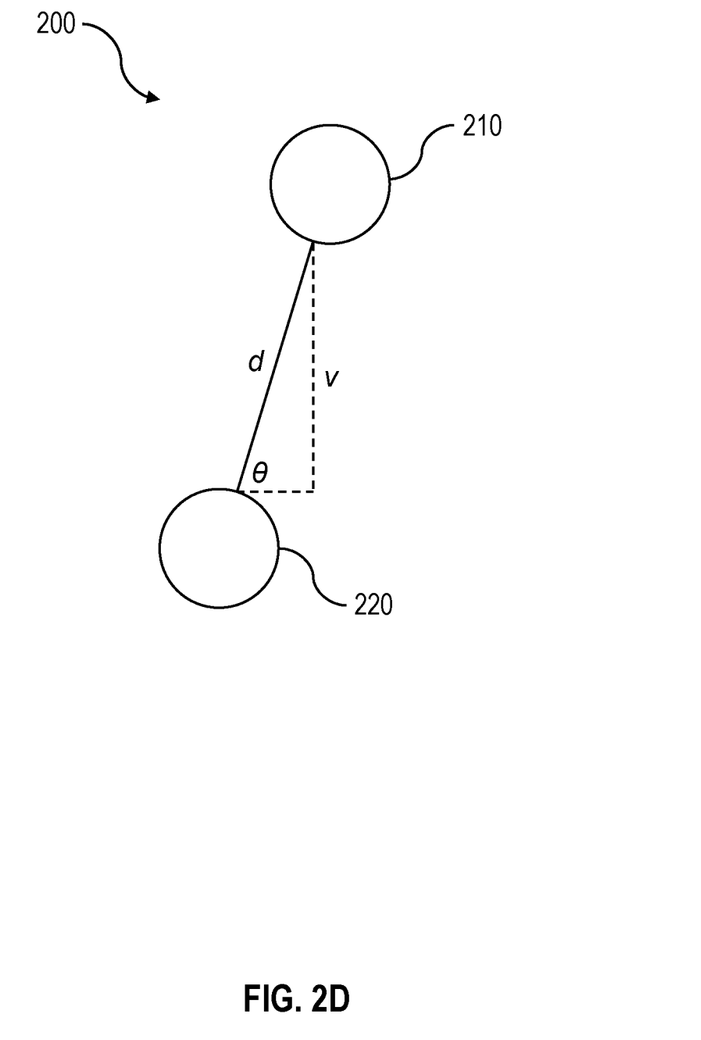
FIG. 2D is a schematic diagram showing a skew angle between portions of the apparatus of FIG. 2A.

FIG. 2D is a schematic diagram showing a skew angle between portions of the apparatus 200. The distance d is the distance between the first body 210 and the second body 220 which can, for example, be determined based on identifying which one of the plurality of electric contacts 224 is in contact with the electric contact 214. The distance v is the vertical height between the first body 210 and the second body 220 in relation to gravity. The angle θ is defined as the skew angle which can, for example, be determined based on identifying which one of the plurality of electric contacts 244 is in contact with the electric contact 234. The distance v can be calculated by Equation 1, based on the determined distance d and the determined skew angle θ. Once the vertical height v is determined, the holdup volume of the oil phase 110a between the first body 210 and the second body 220 can be estimated by multiplying the vertical height y by the distance traveled by the apparatus 200 through the pipe 102 which can be determined, for example, by the odometer 230. The controller 400 can be configured to wirelessly transmit any of the determined data (for example, the distance d between the first body 210 and the second body 220, the skew angle θ between the second body 220 and the beam 222, the vertical height v between the first body 210 and the second body 220, the distance traveled by the apparatus 200 through the pipe 102, the holdup volume of the oil phase 110a between the first body 210 and the second body 220, or any combinations of these) to a different computer, for example, for analysis of the data.

$$v = d \sin \theta \quad (1)$$

In some cases, the first body 210 and the second body 220 are consistently oriented in the expected configuration with the first body 210 above the second body 220 with respect to gravity (that is, the first body 210 floating on top of the oil phase 110a above the second body 220 at the interface between the oil phase 110a and the aqueous phase 110b), and the distance between the first body 210 and the second body 220 and the skew angle are not changing rapidly (for example, within a three-second timeframe). In such cases, the vertical height v and the holdup volume can be expected to be accurately determined based on Equation 1. In some cases, the first body 210 and the second body 220 are consistently oriented in the expected configuration with the first body 210 above the second body 220 with respect to gravity, but the distance between the first body 210 and the second body 220 and/or skew angle are changing rapidly. In such cases, the flow of the multiphase fluid 110 in the pipe 102 may be turbulent, and the vertical height v and the holdup volume can be difficult to be accurately determined based on Equation 1. In some cases, the first body 210 and the second body 220 are not consistently oriented in the expected configuration with the first body 210 above the second body 220 with respect to gravity (for example, the second body 220 might sometimes be located above the first body 210 with respect to gravity), and the distance between the first body 210 and the second body 220 and/or skew angle are changing rapidly. In such cases, it is highly likely that the flow of the multiphase fluid 110 in the pipe 102 is turbulent, which can result in mixing of the oil phase 110a and the aqueous phase 110b into an emulsion in which one of the phases is dispersed throughout the other without distinct, bulk phases.

Figure 3:
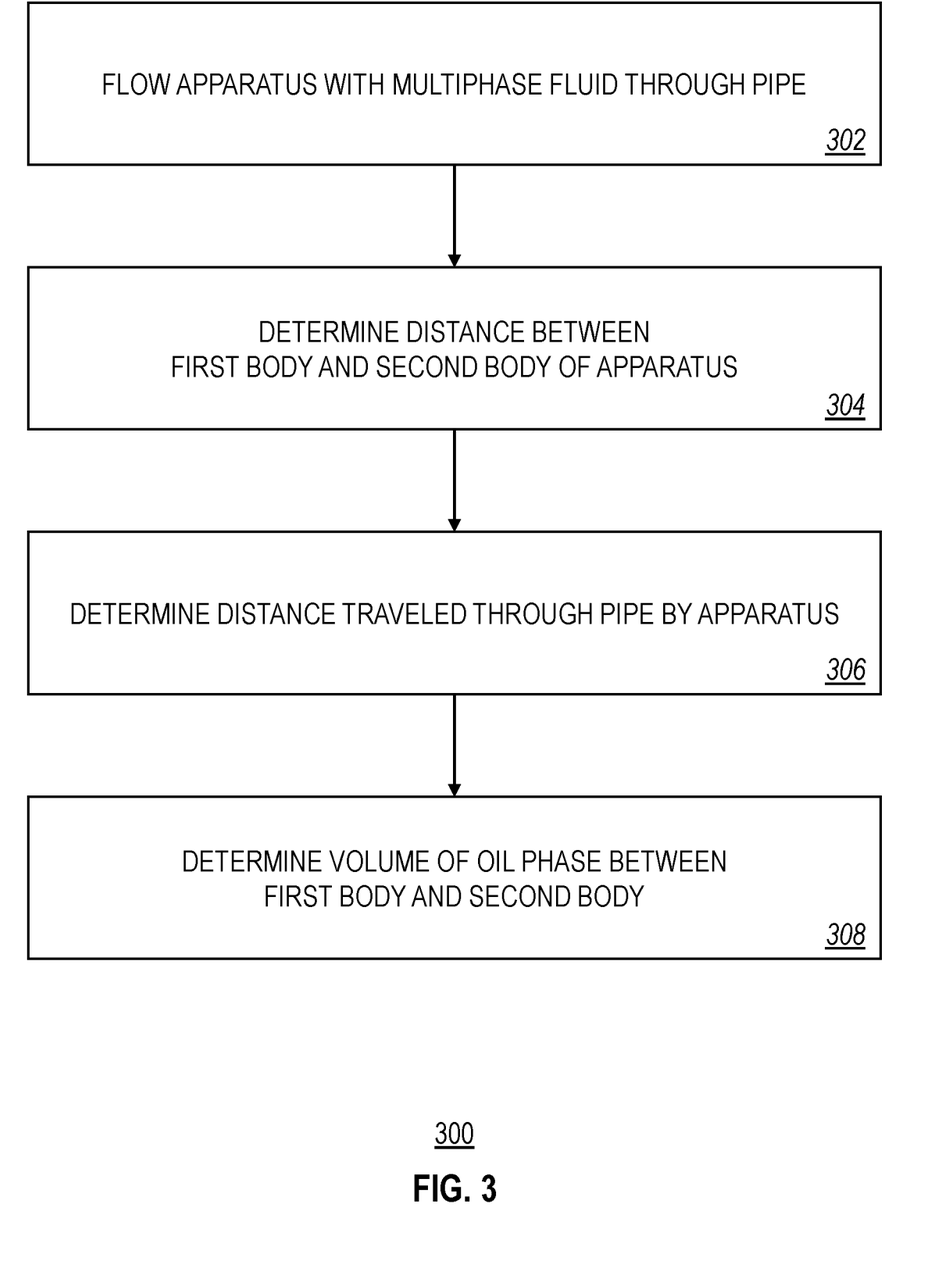
FIG. 3 is a flowchart of an example method for volume measurement in multiphase fluids.

FIG. 3 is a flowchart of an example method 300 for volume measurement in multiphase fluids. The system 100 and/or the apparatus 200 can, for example, implement the method 300. At block 302, an apparatus (such as the apparatus 200) is flowed with a multiphase fluid (such as the multiphase fluid 110) through a pipe (such as the pipe 102). As described previously, the multiphase fluid 110 includes a first phase (such as the oil phase 110a) and a second phase (such as the aqueous phase 110b), and the apparatus 200 includes a first body 210 and a second body 220 that are connected to each other. The first body 210 floats at a surface of the oil phase 110a. The second body floats at an interface between the oil phase 110a and the aqueous phase 110b. At block 304, a distance between the first body 210 and the second body 220 is determined. The distance between the first body 210 and the second body 220 can be determined at block 304, for example, by the controller 400. At block 306, a distance traveled through the pipe 102 by the apparatus 200 is determined. The distance traveled through the pipe 102 by the apparatus 200 can be determined at block 306, for example, by the odometer 230. For example, the odometer 230 can determine the distance traveled by the second body 220 at block 306 in response to rotation of the propeller 231 as the apparatus 200 travels through the pipe 102. At block 308, a volume of the oil phase 110a between the first body 210 and the second body 220 is determined at least based on the distance between the first body 210 and the second body 220 (block 304) and the distance traveled through the pipe 102 by the apparatus 200 (block 306). The volume of the oil phase 110a between the first body 210 and the second body 220 can be determined at block 308, for example, by the controller 400.

As described previously, the apparatus 200 can include the tubular 212, the electric contact 214, and the plurality of electric contacts 224. The tubular 212 can be connected to the first body 210. The electric contact 214 can be disposed at an end of the tubular 212 (for example, the second end 212b). The beam 222 can be coupled to the second body 220. The beam 222 can pass through at least a portion of the tubular 212 and can be at least partially disposed within the tubular 212. The plurality of electric contacts 224 can be disposed along the beam 222 (for example, along the longitudinal length of the beam 222). Any one of the plurality of electric contacts 224 can be in contact with the electric contact 214 at any given time. Determining the distance between the first body 210 and the second body 220 at block 304 can include identifying which one of the plurality of electric contacts 224 is in contact with the electric contact 214. Determining the distance between the first body 210 and the second body 220 at block 304 can include determining the distance between the first body 210 and the second body 220 at least based on the identified one of the plurality of electric contacts 224 that is in contact with the electric contact 214.

As described previously, the beam 222 can be coupled to the second body 220 by a rotatable joint 223. The second body 220 can be configured to rotate about the rotatable joint 223. The rotatable joint 223 can include a ball 223a and a socket 223b. The ball 223a can be connected to the beam 222. The socket 223b can be connected to and disposed within the second body 220. The apparatus 200 can include an electric contact 234 disposed on the ball 223a of the rotatable joint 223. The apparatus 200 can include a plurality of electric contacts 244 distributed across the socket 223b of the rotatable joint 223. Any one of the plurality of electric contacts 244 can be in contact with the electric contact 234 at any given time. The method 300 can include identifying which one of the plurality of electric contacts 244 is in contact with the electric contact 234. The method 300 can include determining an angle at which the second body 220 is skewed with respect to the beam 222 based on the identified one of the plurality of electric contacts 244 that is in contact with the electric contact 234. Determining the volume of the oil phase 110a between the first body 210 and the second body 220 at block 308 can include determining the volume of the oil phase 110a between the first body 210 and the second body 220 at least based on the distance between the first body 210 and the second body 220 (block 304), the distance traveled through the pipe 102 by the apparatus 200 (block 306), and the angle at which the second body 220 is skewed with respect to the beam 222.

Figure 4:
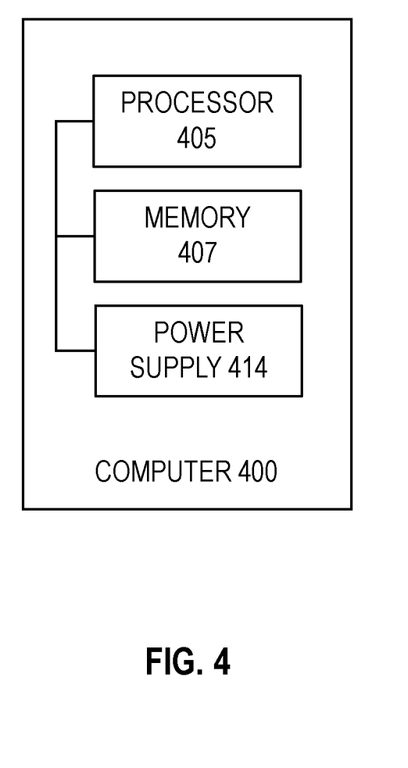
FIG. 4 is a block diagram of an example computer.

FIG. 4 is a block diagram of an example computer 400 used to provide computational functionalities associated with described algorithms, methods, functions, processes, flows, and procedures, as described in this specification, according to an implementation. The illustrated computer 400 is intended to encompass any computing device such as a server, desktop computer, laptop/notebook computer, one or more processors within these devices, or any other processing device, including physical or virtual instances (or both) of the computing device. Additionally, the computer 400 can include a computer that includes an input device, such as a keypad, keyboard, touch screen, or other device that can accept user information, and an output device that conveys information associated with the operation of the computer 400, including digital data, visual, audio information, or a combination of information.

The computer 400 includes a processor 405. The processor 405 may be a microprocessor, a multi-core processor, a multithreaded processor, an ultra-low-voltage processor, an embedded processor, or a virtual processor. In some embodiments, the processor 405 may be part of a system-on-a-chip (SoC) in which the processor 405 and the other components of the computer 400 are formed into a single integrated electronics package. In some implementations, the processor 405 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used. Although illustrated as a single processor 405 in FIG. 4, two or more processors may be used according to particular needs, desires, or particular implementations of the computer 400. Generally, the processor 405 executes instructions and manipulates data to perform the operations of the computer 400 and any algorithms, methods, functions, processes, flows, and procedures as described in this specification. The processor 405 may communicate with other components of the computer 400 over a bus. The bus may include any number of technologies, such as industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in an SoC based system. Other bus technologies may be used, in addition to, or instead of, the technologies above.

The computer 400 also includes a memory 407 that can hold data for the computer 400 or other components (or a combination of both) that can be connected to the network. Although illustrated as a single memory 407 in FIG. 4, two or more memories 407 (of the same or combination of types) can be used according to particular needs, desires, or particular implementations of the computer 400 and the described functionality. While memory 407 is illustrated as an integral component of the computer 400, memory 407 can be external to the computer 400. The memory 407 can be a transitory or non-transitory storage medium. In some implementations, such as in PLCs and other process control units, the memory 407 is integrated with the database 406 used for long-term storage of programs and data. The memory 407 can include any number of volatile and non-volatile memory devices, such as volatile random-access memory (RAM), static random-access memory (SRAM), flash memory, and the like. In smaller devices, such as PLCs, the memory 407 may include registers associated with the processor 405 itself.

The memory 407 stores computer-readable instructions executable by the processor 405 that, when executed, cause the processor 405 to perform operations, such as determining the distance d between the first body 210 and the second body 220, the skew angle θ between the second body 220 and the beam 222, the vertical height v between the first body 210 and the second body 220, the distance traveled by the apparatus 200 through the pipe 102, the holdup volume of the oil phase 110a between the first body 210 and the second body 220, or any combinations of these and wirelessly transmitting any of the determined data. The computer 400 can also include a power supply 414. The power supply 414 can include a rechargeable or non-rechargeable battery that can be configured to be either user- or non-user-replaceable. The power supply 414 can be hard-wired. There may be any number of computers 400 associated with, or external to, a computer system containing computer 400, each computer 400 communicating over the network. Further, the term "client," "user," "operator," and other appropriate terminology may be used interchangeably, as appropriate, without departing from this specification. Moreover, this specification contemplates that many users may use one computer 400, or that one user may use multiple computers 400.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. An apparatus comprising:
   a first body having a first density;
   a tubular having a first end and a second end, wherein the first end is connected to the first body, and the second end is an open end;
   a first electric contact disposed at the second end of the tubular;
   a second body having a second density greater than the first density of the first body;
   a beam coupled to the second body by a rotatable joint, wherein the second body is configured to rotate about the rotatable joint, and the beam passes through the second end of the tubular and is at least partially disposed within the tubular;
   a first plurality of electric contacts disposed along a longitudinal length of the beam, wherein any one of the first plurality of electric contacts is in contact with the first electric contact at any given time; and
   a controller disposed within the second body and communicatively coupled to the first electric contact and the first plurality of electric contacts, wherein the controller is configured to identify which of the first plurality of electric contacts is in contact with the first electric contact, and the controller is configured to determine a distance between the first body and the second body at least based on the identified one of the first plurality of electric contacts that is in contact with the first electric contact.

2. The apparatus of claim 1, comprising an odometer coupled to the second body, wherein the odometer is configured to measure a distance traveled by the second body.

3. The apparatus of claim 2, wherein the controller is communicatively coupled to the odometer, the controller is configured to receive the distance traveled by the second body measured by the odometer, and the controller is configured to determine a volume of fluid between the first body and the second body at least based on the distance traveled by the second body and the distance between the first body and the second body.

4. The apparatus of claim 3, wherein the rotatable joint comprises a ball and a socket, the ball is connected to the beam, and the socket is connected to and disposed within the second body.

5. The apparatus of claim 4, comprising:
a second electric contact disposed on the ball of the rotatable joint; and
a second plurality of electric contacts distributed across the socket of the rotatable joint, wherein any one of the second plurality of electric contacts is in contact with the second electric contact at any given time.

6. The apparatus of claim 5, wherein:
the controller is communicatively coupled to the second electric contact and the second plurality of electric contacts;
the controller is configured to identify which of the second plurality of electric contacts is in contact with the second electric contact;
the controller is configured to determine an angle at which the second body is skewed with respect to the beam based on the identified one of the second plurality of electric contacts that is in contact with the second electric contact; and
the volume of fluid between the first body and the second body is determined at least based on the distance traveled by the second body, the distance between the first body and the second body, and the angle at which the second body is skewed with respect to the beam.

7. A system comprising:
an apparatus configured to be disposed within a pipe flowing a multiphase fluid comprising an oil phase and an aqueous phase, the apparatus configured to travel with the multiphase fluid flowing in the pipe, the apparatus comprising:
a first sphere having a first density less than an oil density of the oil phase, such that the first sphere floats on the oil phase;
a tubular having a first end and a second end, wherein the first end is connected to the first sphere, and the second end is an open end;
a first electric contact disposed at the second end of the tubular;
a second sphere having a second density greater than the oil density and less than an aqueous density of the aqueous phase, such that the second sphere is disposed between the oil phase and the aqueous phase;
a beam coupled to the second sphere by a rotatable joint, wherein the second sphere is configured to rotate about the rotatable joint, and the beam passes through the second end of the tubular and is at least partially disposed within the tubular;
a first plurality of electric contacts disposed along a longitudinal length of the beam, wherein any one of the first plurality of electric contacts is in contact with the first electric contact at any given time; and
a controller disposed within the second sphere and communicatively coupled to the first electric contact and the first plurality of electric contacts, wherein the controller is configured to identify which of the first plurality of electric contacts is in contact with the first electric contact, and the controller is configured to determine a distance between the first sphere and the second sphere at least based on the identified one of the first plurality of electric contacts that is in contact with the first electric contact.

8. The system of claim 7, wherein the apparatus comprises an odometer coupled to an exterior of the second sphere, the odometer comprising a propeller configured to rotate as the apparatus travels through the pipe, the odometer configured to measure a distance traveled by the second sphere in response to rotation of the propeller.

9. The system of claim 8, wherein the controller is communicatively coupled to the odometer, the controller is configured to receive the distance traveled by the second sphere measured by the odometer, and the controller is configured to determine a volume of the first liquid phase between the first sphere and the second sphere at least based on the distance traveled by the second sphere and the distance between the first sphere and the second sphere.

10. The system of claim 9, wherein the rotatable joint comprises a ball and a socket, the ball is connected to the beam, and the socket is connected to and disposed within the second sphere.

11. The system of claim 10, wherein the apparatus comprises:
a second electric contact disposed on the ball of the rotatable joint; and
a second plurality of electric contacts distributed across the socket of the rotatable joint, wherein any one of the second plurality of electric contacts is in contact with the second electric contact at any given time.

12. The system of claim 11, wherein:
the controller is communicatively coupled to the second electric contact and the second plurality of electric contacts;
the controller is configured to identify which of the second plurality of electric contacts is in contact with the second electric contact;
the controller is configured to determine an angle at which the second sphere is skewed with respect to the beam based on the identified one of the second plurality of electric contacts that is in contact with the second electric contact; and
the volume of first liquid phase between the first sphere and the second sphere is determined at least based on the distance traveled by the second sphere, the distance between the first sphere and the second sphere, and the angle at which the second sphere is skewed with respect to the beam.

13. A method comprising:
flowing an apparatus with a multiphase fluid comprising an oil phase and an aqueous phase through a pipe, the apparatus comprising a first body and a second body that are connected to each other, the first body floating at a surface of the oil phase, the second body floating at an interface between the oil phase and the aqueous phase;

determining a distance between the first body and the second body;

determining a distance traveled through the pipe by the apparatus; and determining a volume of the oil phase between the first body and the second body at least based on the distance between the first body and the second body and the distance traveled through the pipe by the apparatus.

14. The method of claim 13, wherein the apparatus comprises a tubular, a first electric contact, a beam, and a first plurality of electric contacts, the tubular is connected to the first body, the first electric contact is disposed at an end of the tubular, the beam is coupled to the second body, the beam passes through at least a portion of the tubular and is at least partially disposed within the tubular, the first plurality of electric contacts are disposed along the beam, any one of the first plurality of electric contacts is in contact with the first electric contact at any given time, and determining the distance between the first body and the second body comprises:

identifying which of the first plurality of electric contacts is in contact with the first electric contact; and determining the distance between the first body and the second body at least based on the identified one of the first plurality of electric contacts that is in contact with the first electric contact.

15. The method of claim 14, wherein the distance traveled by the second body is determined by an odometer comprising a propeller that is coupled to an exterior of the second body, wherein the odometer determines the distance traveled by the second body in response to rotation of the propeller as the apparatus travels through the pipe.

16. The method of claim 15, wherein the beam is coupled to the second body by a rotatable joint, such that the second body is configured to rotate about the rotatable joint, the rotatable joint comprises a ball and a socket, the ball is connected to the beam, and the socket is connected to and disposed within the second body.

17. The method of claim 16, wherein the apparatus comprises:

a second electric contact disposed on the ball of the rotatable joint; and a second plurality of electric contacts distributed across the socket of the rotatable joint, wherein any one of the second plurality of electric contacts is in contact with the second electric contact at any given time.

18. The method of claim 17, comprising:

identifying which of the second plurality of electric contacts is in contact with the second electric contact; and determining an angle at which the second body is skewed with respect to the beam based on the identified one of the second plurality of electric contacts that is in contact with the second electric contact.

19. The method of claim 18, wherein the volume of oil phase between the first body and the second body is determined at least based on the distance traveled by the second body, the distance between the first body and the second body, and the angle at which the second body is skewed with respect to the beam.

* * * * *